(12) United States Patent
Heim et al.

(10) Patent No.: US 12,182,230 B2
(45) Date of Patent: Dec. 31, 2024

(54) DYNAMIC DECISION ENGINE FOR SOFTWARE AUTHORITY TO OPERATE

(71) Applicant: The Boeing Company, Chicago, IL (US)

(72) Inventors: Michael L. Heim, Torrance, CA (US); Christopher Breeden, Seattle, WA (US); Hong Chuen Terence Ho, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 234 days.

(21) Appl. No.: 17/862,140

(22) Filed: Jul. 11, 2022

(65) Prior Publication Data

US 2024/0012884 A1    Jan. 11, 2024

(51) Int. Cl.
  *G06F 21/12* (2013.01)
  *G06F 8/65* (2018.01)

(52) U.S. Cl.
  CPC .............. *G06F 21/121* (2013.01); *G06F 8/65* (2013.01)

(58) Field of Classification Search
  None
  See application file for complete search history.

(56) References Cited

U.S. PATENT DOCUMENTS

| | | | |
|---|---|---|---|
| 11,100,239 B2 * | 8/2021 | Sun | G06F 21/604 |
| 11,210,404 B2 * | 12/2021 | Angelo | H04L 9/3239 |
| 11,966,324 B2 * | 4/2024 | Balasubramanian | G06N 20/00 |
| 11,966,470 B2 * | 4/2024 | Yuceer | G06F 21/552 |
| 2020/0242254 A1 * | 7/2020 | Velur | G06F 21/552 |
| 2021/0200840 A1 * | 7/2021 | Kannan | G06F 8/73 |
| 2022/0253297 A1 * | 8/2022 | Wallis | G06F 8/65 |

* cited by examiner

*Primary Examiner* — Trang T Doan
(74) *Attorney, Agent, or Firm* — MH2 Technology Law Group LLP

(57) ABSTRACT

A system for, and method of, authorizing usage of software developed in an application management platform are disclosed. The techniques include obtaining, from the application management platform, risk qualification parameters for the software; determining a risk qualification value from the risk qualification parameters; obtaining risk threshold parameters; determining a risk threshold value from the risk threshold parameters; comparing the risk qualification value to the risk threshold value to obtain an acceptability state for usage of the software; and performing an authority to operate action based on the acceptability state, where the authority to operate action includes at least one of: authorizing release of the software upon a positive acceptability state, or instructing the application management platform to send an alert upon a negative acceptability state.

16 Claims, 2 Drawing Sheets

DYNAMIC DECISION ENGINE FOR SOFTWARE AUTHORITY TO OPERATE

FIELD

This disclosure relates generally to software development and authorization.

BACKGROUND

An application management platform is a specialized computing environment that manages the development of a software product. An application management platform is typically implemented as cloud computing service. Such an implementation permits provision of infrastructure-as-a-service (IaaS), which allows users to access and develop software on any of a variety of virtual machines. An application platform may include features that facilitate software product development, such as version control infrastructure. An application management platform may include one or more interfaces that permit users to obtain data from, and deliver data to, an environment in which the software product is developed, including the software product itself as it is being developed. An application management platform may include messaging capabilities that permit users to communicate among themselves, as well as receive communications from the application management platform itself, e.g., regarding the software product's development workflow.

Many steps are required to authorize secure release of a software product, usually gated human reviews, including inspecting multiple tool dashboards or application program interfaces to determine the security of the software product. The process may include inspecting multiple tool dashboards or programmatically inspecting multiple application programming interfaces in order to determine the state of the software product's security.

SUMMARY

According to various embodiments, an automated computer-implemented method of authorizing usage of software developed in an application management platform is disclosed. The method includes obtaining, from the application management platform, risk qualification parameters for the software; determining a risk qualification value from the risk qualification parameters; obtaining risk threshold parameters; determining a risk threshold value from the risk threshold parameters; comparing the risk qualification value to the risk threshold value to obtain an acceptability state for usage of the software; and performing an authority to operate action based on the acceptability state, where the authority to operate action includes at least one of: authorizing release of the software upon a positive acceptability state, or instructing the application management platform to send an alert upon a negative acceptability state.

Various optional features of the above method embodiments include the following. The authority to operate action may include authorizing release of the software, and the method may further include automatically deploying the software. The risk qualification parameters may include design time risk parameters. The design time risk parameters may include at least two of: a software security risk security parameter, an application threat model parameter, or a business criticality assessment parameter. The risk qualification parameters may include build time risk parameters. The build time risk parameters may include at least two of: a secrets detection parameter, a static application security testing parameter, a dynamic application security testing parameter, a container vulnerability assessment parameter, a software bill of materials parameter, a software composition analysis parameter, an interactive application security testing parameter, an infrastructure as code scanning parameter, a policy as code parameter, or a code signing parameter. The risk threshold parameters may include runtime risk parameters. The runtime risk parameters may include at least one of: a runtime application security protection parameter or an application security telemetry parameter. The risk threshold parameters may include real time risk and threat parameters. The real time risk and threat parameters may include at least one of: a code risk analysis parameter or a threat intel parameter.

According to various embodiments, a computer system for authorizing usage of software developed in an application management platform is disclosed. The computer system includes an electronic processor and a persistent non-transitory computer-readable medium including instructions that, when executed by the electronic processor, configure the electrotonic processor to perform actions including: obtaining, from the application management platform, risk qualification parameters for the software; determining a risk qualification value from the risk qualification parameters; obtaining risk threshold parameters; determining a risk threshold value from the risk threshold parameters; comparing the risk qualification value to the risk threshold value to obtain an acceptability state for usage of the software; and performing an authority to operate action based on the acceptability state, where the authority to operate action includes at least one of: authorizing release of the software upon a positive acceptability state, or instructing the application management platform to send an alert upon a negative acceptability state.

Various optional features of the above system embodiments include the following. The authority to operate action may include authorizing release of the software, and the method may further include automatically deploying the software. The risk qualification parameters may include design time risk parameters. The design time risk parameters may include at least two of: a software security risk security parameter, an application threat model parameter, or a business criticality assessment parameter. The risk qualification parameters may include build time risk parameters. The build time risk parameters may include at least two of: a secrets detection parameter, a static application security testing parameter, a dynamic application security testing parameter, a container vulnerability assessment parameter, a software bill of materials parameter, a software composition analysis parameter, an interactive application security testing parameter, an infrastructure as code scanning parameter, a policy as code parameter, or a code signing parameter. The risk threshold parameters may include runtime risk parameters. The runtime risk parameters may include at least one of: a runtime application security protection parameter or an application security telemetry parameter. The risk threshold parameters may include real time risk and threat parameters. The real time risk and threat parameters may include at least one of: a code risk analysis parameter or a threat intel parameter.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Some embodiments provide a mechanism to automatically security-authorize the release of any workload, such as a software product, developed in an application management platform (such as a DevSecOps pipeline or automated continuous integration and continuous deployment (CI/CD) pipeline). Some embodiments operate continuously, e.g., at every pass of a workload through an application management platform development pipeline.

According to some embodiments, design-time and build-time parameters are assigned a risk-based weighted value. The weighting assignment may be mapped from development team assessment tools or security activities. Generally, the weightings may be derived from external automated assessments and the severity levels of related security findings. Some embodiments provide the outcome as a single numeric risk qualification value (e.g., 1-10).

According to some embodiments, runtime and real-time factors are assigned a risk-based weighted value. The weighting assignment may be mapped from production and real-world threat events. Some embodiments provide the outcome as a single numeric risk threshold value (e.g., 1-10)

According to some embodiments, the risk qualification must meet or exceed the risk threshold for security and deployment authorization. This outcome may be reported to the application management platform and establish the acceptability state for the workload to deploy.

Some embodiments operate without requiring any human interaction or intervention. Accordingly, some embodiments provide the ability to automatically authorize relates of a newly developed software application. These and other features and advantages are set forth in detail below.

Figure 1:
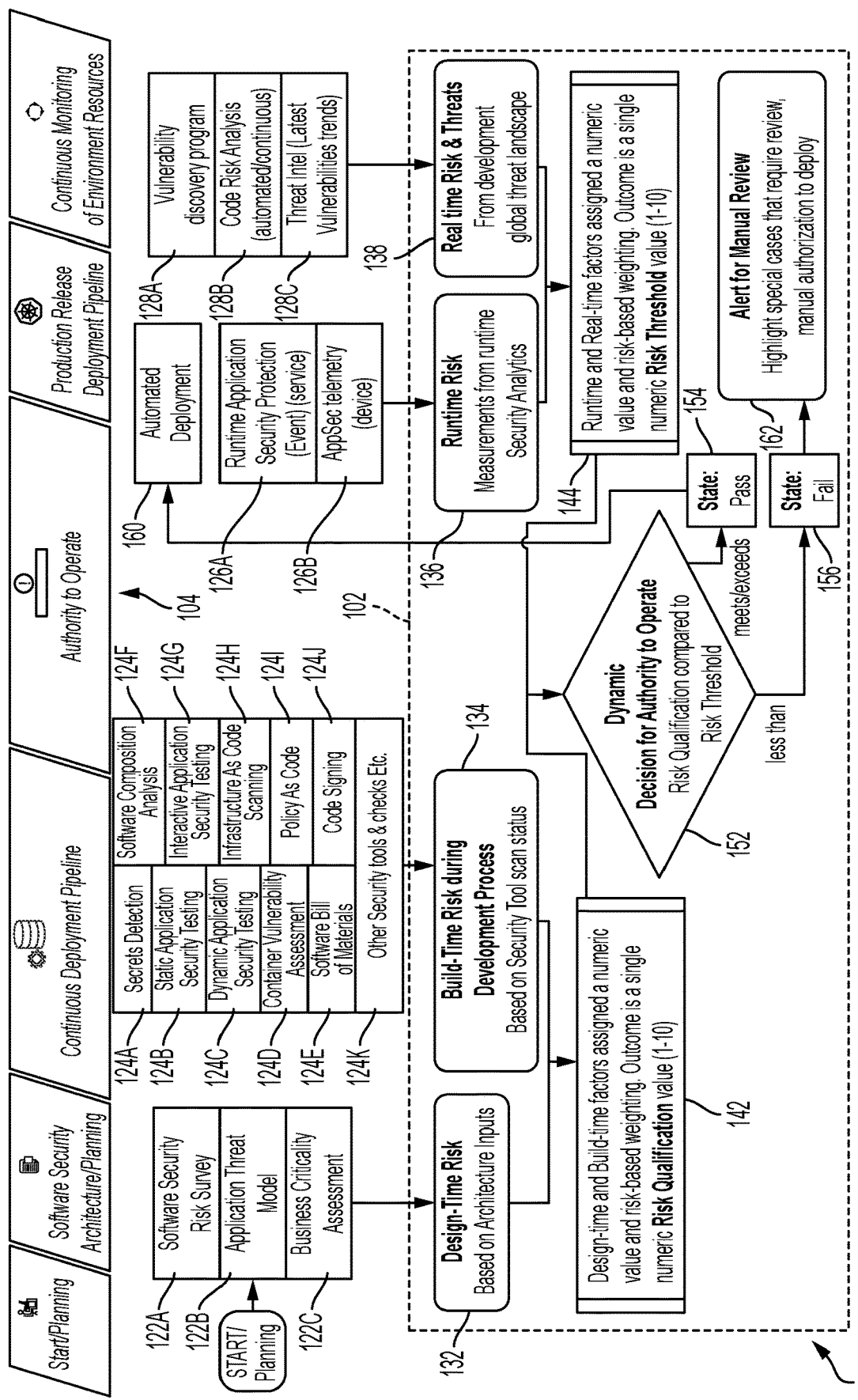
FIG. 1 is a schematic diagram of a software authority to operate decision engine in the context of an application management platform according to various embodiments.

FIG. 1 is a schematic diagram 100 of a software authority to operate decision engine 102 in the context of an application management platform according to various embodiments. The authority to operate decision engine 102 may be implemented using software that interacts with the application management platform. For example, the authority to operate decision engine 102 may be implemented in a cloud-based platform. The authority to operate engine 102 may include an electronic processor and persistent memory that includes instructions that, when executed by the electronic processor, performs actions as described herein.

The top of the schematic diagram 100 depicts a software product development timeline 104. The software product development timeline 104 depicts software product development phases, including start/planning, software security architecture/planning, continuous deployment pipeline, authority to operate, production release deployment pipeline, and continuous monitoring.

The authority to operate decision engine 102 obtains parameters from various phases of the software product development pipeline and from various sources, including the application management platform. The authority to operate decision engine 102 may obtain parameters from any, or a combination, of: the application management platform (e.g., for design-time risk parameters 132), a security scan tool (e.g., for build-time risk parameters 134), runtime security analytics (e.g., for runtime risk parameters 136), and/or other sources, such as development and global threat landscape assessments (e.g., for real-time risk and threat parameters 138).

The authority to operate engine 102 obtains design-time risk parameters 132 at the software security architecture/planning phase. The design-time risk parameters 132 may be obtained from the application management platform using microservice connections, application program interfaces, or other data conduits. In general, the design-time risk parameters 132 quantify how vulnerable the software product's architecture is to cyberattacks and how much damage such attacks would do to a business using the software product. For example, an absence of formal security evaluations of a software product that is central to a business model may result in a high value for one or more of the design-time risk parameters 132.

The design-time risk parameters 132 include a software security risk survey parameter 122A. The software security risk survey parameter 122A can be based on, e.g., be a weighted sum of, any, or a combination, of quantifications for: whether the software security risk survey is complete (e.g., yes/no, or 1/0), whether the software security risk survey has been approved by a security organization (e.g., yes/no, or 1/0), and/or a software architecture risk determination (e.g., high/medium/low severity, or 0.0/0.5/1.0).

Another design-time risk parameter 132 is an application threat model parameter 122B. The application threat model parameter 122B can be based on, e.g., be a weighted sum of, any, or a combination, of quantifications for: whether the threat model is complete (e.g., yes/no, or 1/0), whether any threat model open issues have been resolved (e.g., high/medium/low severity, or 0.0/0.5/1.0), and/or whether the threat model has been approved by a security organization (e.g., yes/no, or 1/0).

Yet another design-time risk parameter 132 is a business criticality assessment parameter 122C. The business criticality assessment parameter 122C can be based on, e.g., be a weighted sum of, any, or a combination, of quantifications for: whether the business criticality assessment is complete (e.g., yes/no, or 1/0), whether the business criticality assessment has been approved by a security organization (e.g., yes/no, or 1/0), and/or a business criticality determination (e.g., high/medium/low severity, or 0.0/0.5/1.0).

The above design-time risk parameters 132 are non-limiting; other design-time risk parameters may be used in the addition or in the alternative.

The authority to operate engine 102 obtains build-time risk parameters 134 at the continuous deployment pipeline phase. The build-time risk parameters 132 may be obtained from a security scan tool and be based on a security scan status. In general, the build-time risk parameters 134 quantify how vulnerable the software product's processes are to cyberattacks. For example, the presence of unresolved cyberattack vectors in a software product may result in a high value for one or more of the build-time risk parameters 134.

The build-time risk parameters 134 can include a secrets detection parameter 124A. The secrets detection parameter 124A can be based on, e.g., a quantification of whether secrets have been detected in the code (e.g., yes/no, or 1/0).

Another build-time risk parameter 134 is a static application security testing (SAST) parameter 124B. The static application security testing (SAST) parameter 124B can be based on, e.g., be a weighted sum of, any, or a combination, of quantifications for: whether the SAST scan has been performed (e.g., yes/no, or 1/0), and/or unresolved SAST vulnerabilities by severity (e.g., high/medium/low severity, or 0.0/0.5/1.0).

Yet another build-time risk parameter 134 is a dynamic application security testing (DAST) parameter 124C. The dynamic application security testing (DAST) parameter 124C can be based on, e.g., be a weighted sum of, any, or a combination, of quantifications for: whether the DAST scan has been performed (e.g., yes/no, or 1/0), and/or unresolved DAST vulnerabilities by severity (e.g., high/medium/low severity, or 0.0/0.5/1.0).

Yet another build-time risk parameter 134 is a container vulnerability assessment (CVA) parameter 124D. The container vulnerability assessment (CVA) parameter 124D can be based on, e.g., be a weighted sum of, any, or a combination, of quantifications for: whether the CVA scan has been performed (e.g., yes/no, or 1/0), and/or unresolved container vulnerabilities by severity (e.g., high/medium/low severity, or 0.0/0.5/1.0).

Yet another build-time risk parameter 134 is a software bill of materials parameter 124E. The software bill of materials parameter 124E can be based on whether the list of software dependencies has been collected (e.g., yes/no, or 1/0).

Yet another build-time risk parameter 134 is a software composition analysis (SCA) parameter 124F. The SCA parameter 124F can be based on, e.g., be a weighted sum of, any, or a combination, of quantifications for: whether the SCA scan has been performed (e.g., yes/no, or 1/0), and/or unresolved vulnerable software dependencies by severity (e.g., high/medium/low severity, or 0.0/0.5/1.0).

Yet another build-time risk parameter 134 is an interactive application security testing (IAST) parameter 124G. The IAST parameter 124G can be based on, e.g., be a weighted sum of, any, or a combination, of quantifications for: whether the IAST scan has been performed (e.g., yes/no, or 1/0), and/or unresolved IAST vulnerabilities by severity (e.g., high/medium/low severity, or 0.0/0.5/1.0).

Yet another build-time risk parameter 134 is an infrastructure as code (IAC) parameter 124H. The IAC parameter 124H can be based on, e.g., be a weighted sum of, any, or a combination, of quantifications for: whether the IAC scan has been performed (e.g., yes/no, or 1/0), and/or unresolved IAC vulnerabilities by severity (e.g., high/medium/low severity, or 0.0/0.5/1.0).

Yet another build-time risk parameter 134 is a policy as code parameter 124I. The policy as code parameter 124I can be based on a quantification of whether a policy as code implementation has been satisfied (e.g., yes/no, or 1/0).

Yet another build-time risk parameter 134 is a code signing parameter 124J. The code signing parameter 124J can be based on, e.g., be a weighted sum of, any, or a combination, of quantifications for: whether the package has been signed with code signing service (e.g., yes/no, or 1/0), and/or whether the signature has been verified from organization (e.g., yes/no, or 1/0).

The above examples of build-time risk parameters 134 are non-limiting; other security tools and checks 124K may be included.

The authority to operate engine 102 obtains runtime risk parameters 136 at the production release deployment pipeline phase. The runtime risk parameters 136 may be obtained from runtime security analytics, for example. In general, the runtime risk parameters 136 quantify the presence of active threats against the software product as measured on the product itself during runtime. For example, the detection of ongoing cyberattacks on a deployed software product may result in a high value for one or more of the runtime risk parameters 136.

The runtime risk parameters 136 can include a runtime application security protection events parameter 126A. The runtime application security protection events parameter 126A can be based on a quantification of severity (e.g., high/medium/low severity, or 0.0/0.5/1.0).

Another runtime risk parameter 136 is an application security telemetry events by severity parameter 126B. The application security telemetry events by severity parameter 126B can be based on a quantification of severity (e.g., high/medium/low severity, or 0.0/0.5/1.0).

The above examples of runtime risk parameters 136 are non-limiting; additional collected runtime security events may be considered.

The authority to operate engine 102 obtains real-time risk and threat parameters 138 at the continuous monitoring of environmental resources phase. The real-time risk and threat parameters 138 may be obtained from third-party sources, such as development and global threat landscape evaluation providers. In general, the real-time risk and threat parameters 138 quantify the likelihood of threats against the software product as measured from threat possibilities independent from the actual execution of the software product. For example, the presence of ongoing cyber-hostilities between a nation of a user of a software product and an adversarial nation may result in a high value for one or more real-time risk and threat parameters 138.

The real-time risk and threat parameters 138 can include a vulnerability discovery program (VDP) parameter 128A. The VDP parameter 128A can be based on, e.g., be a weighted sum of, any, or a combination, of quantifications for: findings submitted to VDP intake provided by external bug bounty programs with severity rating (e.g., high/medium/low severity, or 1.0/0.5/0.0), and/or independent security researchers, in machine readable format with severity rating (e.g., high/medium/low severity, or 1.0/0.5/0.0).

Another real-time risk and threat parameter 138 is a code risk analysis/architecture drift prevention parameter 128B. The code risk analysis/architecture drift prevention parameter 128B can be based on continuous scans of the workload software repository for software architecture changes that have not been analyzed by design-time security activities (e.g., software security risk assessment 122A, threat modeling 122B, etc.). Findings can be generated in machine readable format with a severity rating (e.g., high/medium/ low severity, or 1.0/0.5/0.0).

Yet another real-time risk and threat parameter 138 is a threat intel—security operations center (SOC) intel parameter 128C. The threat intel—security operations center (SOC) intel parameter 128C can be based on, e.g., be a weighted sum of, any, or a combination, of quantifications for: events relevant to the platform/environment hosting the workload provided by SOC team in machine readable format with severity rating (e.g., high/medium/low severity, or 1.0/0.5/0.0), and/or events related to organizational or nation state threats provided by a threat Intel team in machine readable format with severity rating (e.g., high/medium/low severity, or 1.0/0.5/0.0).

The above examples of real-time risk and threat parameters 138 are non-limiting; additional collected real-time security events may be considered.

The authority to operate engine 102 accepts the design-time risk parameters 132 and the build-time risk parameters 134 and generates a corresponding risk qualification value 142. The risk qualification value 142 may be determined as, for example, a weighted sum of the various design-time risk parameter 132 and the build-time risk parameter 134 quantifications. In general, the risk qualification value 142 represents a single quantification of vulnerability of a software product to various security violations.

The authority to operate engine 102 accepts the runtime risk parameters 136 and the real-time risk and threat parameters 138 and generates a corresponding risk threshold value 144. The risk threshold value 144 may be determined as, for example, a weighted sum of the various runtime risk parameters 136 and the real-time risk and threat parameters 138 quantifications. In general, the risk threshold value 144 represents a single quantification of likelihood of exposure of a software product to various security violations.

The authority to operate engine 102 then determines an acceptability state by performing a comparison 152 of the risk qualification value 142 to the risk threshold value 144 to determine whether the former is at least as large as the latter. In general, the higher the likelihood of exposure of a software product to security violations, as quantified by the risk threshold value 144, the lower the vulnerability of the software to security violations, as measured by the risk qualification value 142, needs to be in order to authorize deployment of the software product.

If the risk qualification value 142 is at least as large as the risk threshold value 144, then the acceptability state is "pass" 154. Otherwise, if the risk qualification value 142 is less than the risk threshold value 144, then the acceptability state is "fail" 156.

For an acceptability state of "pass" 154, the authority to operate engine 102 performs automatic deployment 160 the software product.

For an acceptability state of "fail" 156, the authority to operate engine 102 sends an alert 162 requesting that the software product be subjected to manual review. The authority to operate engine 102 can send the alert by instructing the application management platform to send a communication via its native messaging capability.

The parameters set forth herein in reference to FIG. 1 are exemplary and non-limiting. Other parameters may be used in addition or in the alternative. For example, the risk qualification parameters of design time risk parameters 132 and build-time risk parameters 134 are exemplary and non-limiting; other risk qualification parameters may be used in addition or in the alternative. Further, the example parameters within the categories of design time risk parameters 132 and build-time risk parameters 134 as shown and described herein in reference to FIG. 1 are exemplary and non-limiting; other parameters within these categories may be used in addition or in the alternative. As another example, the risk threshold parameters of runtime risk 136 and real-time risk and threats 138 are exemplary and non-limiting; other risk threshold parameters may be used in addition or in the alternative. Further, the example parameters within the categories of runtime parameters 136 and real-time risk and threat parameters 138 as shown and described herein in reference to FIG. 1 are exemplary and non-limiting; other parameters within these categories may be used in addition or in the alternative.

Figure 2:
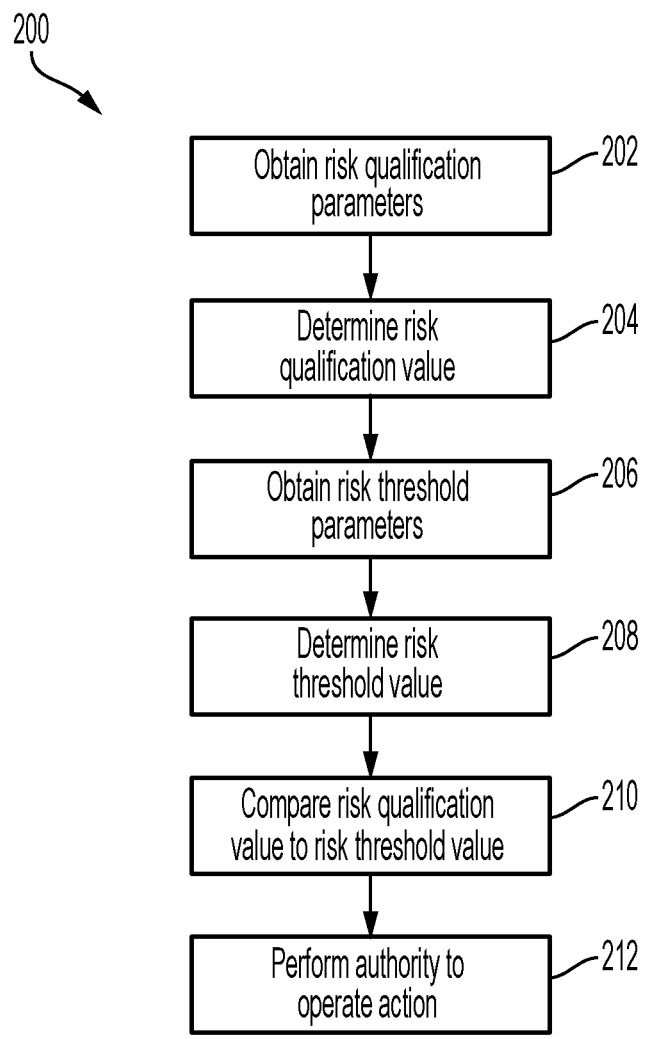
FIG. 2 is a flow diagram of an automated method of authorizing usage of software developed in an application management platform according to various embodiments.

FIG. 2 is a flow diagram of an automated method 200 of authorizing usage of software developed in an application management platform according to various embodiments. The method 200 may be implemented by an authority to operate engine such as the authority to operate engine 102 as shown and described herein in reference to FIG. 1.

At 202, the method 200 obtains, from the application management platform, risk qualification parameters for the software. The actions of this block may include any, or a combination, of actions regarding design-time risk parameters 132, and/or build-time risk parameters 134, as shown and described in reference to FIG. 1.

At 204, the method 200 determines a risk qualification value from the risk qualification parameters. The actions of this block may include the actions regarding the risk quantification value 142, as shown and described in reference to FIG. 1.

At 206, the method 200 obtains risk threshold parameters. The actions of this block may include any, or a combination, of actions regarding runtime risk parameters 136, and/or real-time risk and threat parameters 138, as shown and described in reference to FIG. 1.

At 208, the method 200 determines a risk threshold value from the risk threshold parameters. The actions of this block may include the actions regarding the risk threshold value 144, as shown and described in reference to FIG. 1.

At 210, the method 200 compares the risk qualification value to the risk threshold value to obtain an acceptability state for usage of the software. The actions of this block may include the actions regarding the comparison 152, as shown and described in reference to FIG. 1.

At 212, the method 200 performs an authority to operate action based on the acceptability state. The actions of this block may include any, or a combination, of actions regarding automatic deployment 162 and/or sending an alert 162, as shown and described herein in reference to FIG. 1.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. An automated computer-implemented method of authorizing usage of software developed in an application management platform, the method comprising:
    obtaining, from the application management platform, risk qualification parameters for the software, wherein the application management platform comprises a computing environment that manages the development of a software product, wherein the application management platform allows a user to access and develop software on any of a plurality of virtual machines, wherein the risk quantification parameters comprise design time risk parameters obtained at a software security architecture/planning phase, and wherein the risk quantification parameters comprise build time risk parameters obtained at a continuous deployment pipeline phase;
    determining a risk qualification value from the risk qualification parameters;
    obtaining risk threshold parameters;
    determining a risk threshold value from the risk threshold parameters;
    comparing the risk qualification value to the risk threshold value to obtain an acceptability state for usage of the software; and
    performing an authority to operate action based on the acceptability state, wherein the authority to operate action comprises at least one of: authorizing release of the software upon a positive acceptability state, or instructing the application management platform to send an alert upon a negative acceptability state.

2. The automated computer-implemented method of claim 1, wherein the authority to operate action comprises authorizing release of the software, the method further comprising:
    automatically deploying the software.

3. The automated computer-implemented method of claim 1, wherein the design time risk parameters comprise at least two of: a software security risk security parameter, an application threat model parameter, or a business criticality assessment parameter.

4. The automated computer-implemented method of claim 1, wherein the build time risk parameters comprise at least two of: a secrets detection parameter, a static application security testing parameter, a dynamic application security testing parameter, a container vulnerability assessment parameter, a software bill of materials parameter, a software composition analysis parameter, an interactive application security testing parameter, an infrastructure as code scanning parameter, a policy as code parameter, or a code signing parameter.

5. The automated computer-implemented method of claim 1, wherein the risk threshold parameters comprise runtime risk parameters.

6. The automated computer-implemented method of claim 5, wherein the runtime risk parameters comprise at least one of: a runtime application security protection parameter or an application security telemetry parameter.

7. The automated computer-implemented method of claim 1, wherein the risk threshold parameters comprise real time risk and threat parameters.

8. The automated computer-implemented method of claim 7, wherein the real time risk and threat parameters comprise at least one of: a code risk analysis parameter or a threat intel parameter.

9. A computer system for authorizing usage of software developed in an application management platform, the computer system comprising an electronic processor and a persistent non-transitory computer-readable medium comprising instructions that, when executed by the electronic processor, configure the electronic processor to perform actions comprising:
    obtaining, from the application management platform, risk qualification parameters for the software, wherein the application management platform comprises a computing environment that manages the development of a software product, wherein the application management platform allows a user to access and develop software on any of a plurality of virtual machines, wherein the risk quantification parameters comprise design time risk parameters obtained at a software security architecture/planning phase, and wherein the risk quantification parameters comprise build time risk parameters obtained at a continuous deployment pipeline phase;
    determining a risk qualification value from the risk qualification parameters;
    determining a risk qualification value from the risk qualification parameters;
    obtaining risk threshold parameters;
    determining a risk threshold value from the risk threshold parameters;
    comparing the risk qualification value to the risk threshold value to obtain an acceptability state for usage of the software; and
    performing an authority to operate action based on the acceptability state, wherein the authority to operate action comprises at least one of: authorizing release of the software upon a positive acceptability state, or instructing the application management platform to send an alert upon a negative acceptability state.

10. The computer system of claim 9, wherein the authority to operate action comprises authorizing release of the software, the method further comprising:
    automatically deploying the software.

11. The computer system of claim 9, wherein the design time risk parameters comprise at least two of: a software security risk security parameter, an application threat model parameter, or a business criticality assessment parameter.

12. The computer system of claim 9, wherein the build time risk parameters comprise at least two of: a secrets detection parameter, a static application security testing parameter, a dynamic application security testing parameter, a container vulnerability assessment parameter, a software bill of materials parameter, a software composition analysis parameter, an interactive application security testing parameter, an infrastructure as code scanning parameter, a policy as code parameter, or a code signing parameter.

13. The computer system of claim 9, wherein the risk threshold parameters comprise runtime risk parameters.

14. The computer system of claim 13, wherein the runtime risk parameters comprise at least one of: a runtime application security protection parameter or an application security telemetry parameter.

15. The computer system of claim 9, wherein the risk threshold parameters comprise real time risk and threat parameters.

16. The computer system of claim 15, wherein the real time risk and threat parameters comprise at least one of: a code risk analysis parameter or a threat intel parameter.

* * * * *